Nov. 11, 1958     M. HOROVITZ     2,859,651
CONNECTING PIN HAVING DEPRESSIBLE LOCKING
ELEMENT MOUNTED IN A RUBBER SLEEVE
Filed Oct. 19, 1954

Inventor
Marcus Horovitz
By Ralph B. Stewart
attorney

United States Patent Office 2,859,651
Patented Nov. 11, 1958

2,859,651

CONNECTING PIN HAVING DEPRESSIBLE LOCKING ELEMENT MOUNTED IN A RUBBER SLEEVE

Marcus Horovitz, Leicester, England, assignor to Metalastik Limited, Leicester, England, a corporation of Great Britain Application October 19, 1954, Serial No. 463,260

Claims priority, application Great Britain October 20, 1953

5 Claims. (Cl. 85—5)

This invention relates to pins for connecting together parts which have to be connected together in a manner which while secure in itself permits of the ready release of the parts when so desired. Preferably this ready release is to be effected without destruction of or damage to either the parts or the pin.

An example of a situation calling for a connecting pin which meets these requirements occurs in the connection together of adjacent lengths of the chain of a solid link chain conveyor used in underground mining. Here the conveyor has to be shifted frequently, perhaps daily, in a transverse direction in order to keep it in proximity to the work face; and owing to the existence of pit props and the like this shifting can be done only by a dismantling of the chain. In such circumstances the connecting pin must be robust enough to stand repeated hammering into and out of place, while holding its parts securely when in place.

In the case just mentioned of a solid link chain conveyor it has previously been proposed to use a pin having spring loaded balls; at one end of the pin is an enlarged head, while near the other end is formed a transverse or diametrical hole within which is located a helical spring. On either side of the spring is a ball which protrudes slightly from the diametrical hole, the edge of the hole being turned over a little in order to reduce the size of the hole at the mouth and thereby restrain the ball from passing completely out of the hole. Such a pin can be forced through reasonably close-fitting apertures in the links or other elements to be secured together, the outwardly-pressed balls then serving to prevent accidental dislodgment of the pin. However, the spring pressure is not so great as to prevent removal of the pin by striking with a hammer or like tool the end of the pin. The trouble has been experienced with such pins that the balls become stuck in their protruding position so that removal of the pin is difficult or even impossible without damage to the pin. This sticking may be due to rusting of the parts, or to the creeping of dust or grit into the hole and between the convolutions of the spring.

Accordingly it is one of the objects of this invention to provide a pin which shall be less liable to these troubles.

The present invention is characterized in that a locking element is supported from the pin solely by a rubber-like sleeve surrounding the element and filling the annular space between the element and the side walls of a chamber formed transversely of the pin, the sleeve being loaded at least mainly in shear when the locking element is displaced inwardly of the chamber to permit connection of two parts by the pin. In some applications the rubber-like sleeve may be subject to compression on said displacement but the amount of compression is quite small compared with the amount of shear deflection. In some cases shear deflection only may result.

Two important advantages result from this arrangement. Firstly, since the locking element is supported solely by the rubber sleeve and the element and pin are invariably of metal (e. g. steel) rusting of metal parts in contact with each other, and hence sticking of the element, is avoided. The pin may therefore be used with confidence in the knowledge that it can be inserted without trouble, it will assuredly lock the parts together which are to be connected by the pin and that the pin can be withdrawn without difficulty. Secondly, as the rubber sleeve acts in shear the pin can be inserted and removed without great effort. If the rubber mounting were loaded completely or mainly in compression, the force required to displace the locking element would be very great as is well known. Because of the relatively small force called for when the rubber acts in shear or mainly in shear no special tools are required for inserting or removing the pin. Of course the pin is so designed that the shear force is sufficient to prevent inadvertent removal of the pin and this may conveniently be done in known manner.

The following description relates to the accompanying drawing which shows by way of example only two embodiments of the invention. In the drawing.

Figure 1:
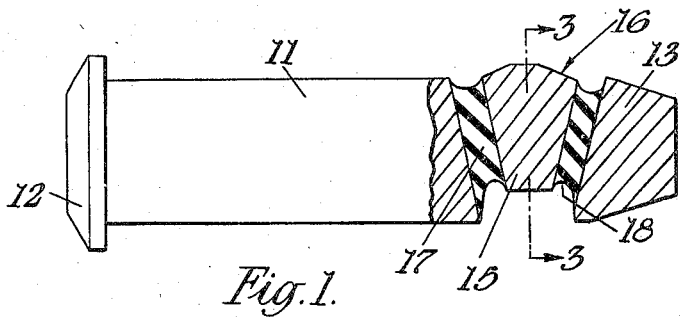
Figure 1 is a side view partly in section of a first embodiment.
Figure 2:
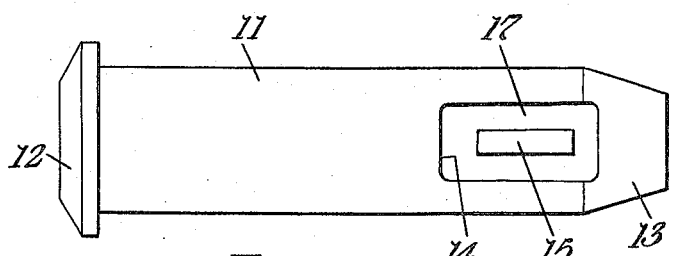
Figure 2 is a plan view.
Figure 3:
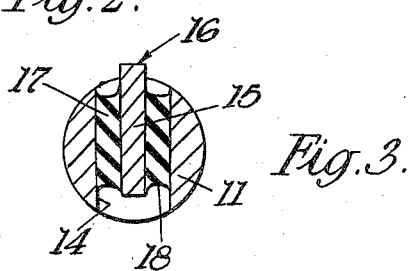
Figure 3 is a section on the line 3—3 of Figure 1.

In Figures 1 to 3 of the accompanying drawing is shown a connecting pin in accordance with this invention. The pin is of the usual configuration and size, having a cylindrical shank 11, and enlarged head 12 at what may be called the rear end, and a slightly tapered tip 13 at what may be called the front end. The pin is intended to be pushed through aligned apertures in the parts to be connected until the shoulder under the head 12 meets the marginal face on one side of the parts and the tip 13 projects beyond the face on the other side.

Immediately to the rear of the tip 13 there is a chamber 14 of rectangular shape the transverse or side walls of which taper down uniformly along a diameter of the pin from an opening in one side of the pin to the other side of the pin. The locking element is in the form of a wedge-shaped plate 15 with its wider end 16 rounded so as to constitute a part projecting outwardly through the opening. This wedge-shaped plate 15 is arranged within the rectangular chamber 14 with its narrow end away from the opening into the chamber and with its width extending parallel with the long axis of the pin, the rectangular chamber having a greater length axially of the pin than tangentially thereof. Within the chamber 14, the annular space defined between the transverse or side walls of the chamber 14 and side walls of plate 15 is filled with a resilient mounting element, such as the rubber sleeve 17. The taper of the plate 15 is the same as that of the walls of chamber 14, that is to say the thickness of the sleeve 17 is uniform. Preferably, the inner surface of sleeve 17 is bonded to plate 15 and its outer surface is bonded to the side walls of chamber 14. With such a design, when the plate is pressed inwards the rubber is loaded substantially in shear. The rubber sleeve 17 is formed with an annular recess 18 at the narrow end of the chamber and the space within the chamber opposite the inner end of the plate 15 is free of rubber so as to improve the resilient quality of the locking device.

Figure 4:
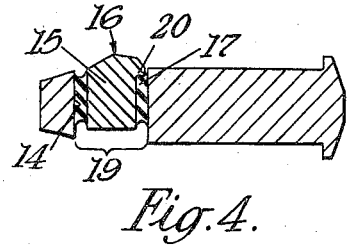
Figure 4 is a view similar to Figure 1 of a second embodiment.

In Figure 4 there is shown a slightly different form of connecting pin. Here the chamber 14, still rectangular, has parallel transverse walls instead of being tapered, while the locking plate 15 is likewise parallel-sided. One feature of this design is that the broaching operation is simplified. The sleeve 17 is loaded in pure shear when the insert 15 is pressed inwards.

It will also be noticed in Figure 4 that the protruding end 16 of the plate 15 has different tapers on its two sides, so that while the pin can be very easily driven into place, the greater chamfer on the rear side makes withdrawal more difficult. Thus it is ensured that the pin does not slide out when sideways load is applied.

Furthermore, the shank 11 of the pin has a slightly reduced section 19 in the vicinity of the locking device, and the locking element 15 is provided with a key 20 which prevents the chain sliding too far over the reduced section of the pin where the chamber 14 is.

It will be understood of course that the invention may take other forms than those shown in the drawing. Where larger connecting pins are used the diameter of the pin may be such as to permit of the use of a cylindrical bush fitting within a correspondingly cylindrical diametral hole. The locking element may then be a central pin, either cylindrical or conical. In all cases, however, it is the rubber filling which holds the locking element in its protruding position in a yielding manner, the rubber being deflected in shear when the locking element is pressed inwards.

What I claim is:

1. A connecting pin having a chamber formed in the shank thereof, the walls of said chamber extending transversely of the pin and having an opening in the side of the pin leading into the chamber, a locking element within the chamber spaced, from the transverse walls thereof to define an annular space between the element and the side walls of the chamber, the element projecting outwardly through the opening, and a rubber-like mounting for said element comprising a rubber sleeve within the annular space, the inner surface of said sleeve being secured to the element and the outer surface thereof being secured to the transverse walls only of the chamber said sleeve being long with respect to its wall thickness and constituting the sole means of support of the element from the pin, and the space within said chamber opposite the inner end of said locking element being free of rubber, whereby when the element is pressed transversely of the pin into the chamber from said opening the rubber mounting is loaded mainly in shear.

2. A connecting pin as claimed in claim 1 wherein the locking element has sides which converge inwardly of the chamber from said opening.

3. A connecting pin as claimed in claim 1 in which the walls of the chamber diverge towards said opening.

4. A connecting pin as claimed in claim 1 in which the locking element has sides which converge inwardly of the chamber from said opening and in which the walls of the chamber diverge towards said opening.

5. A connecting pin as claimed in claim 1 wherein the outwardly-projecting portion of the locking element is chamfered on the side thereof which is directed towards the end of the pin which is first inserted to one of a pair of parts to be connected by the pin and is also chamfered on the oppositely directed side, the chamfer on the first side of the element referred to being less acute than on said second side.

References Cited in the file of this patent

UNITED STATES PATENTS

| 204,731 | Hill | June 11, 1878 |
| 937,402 | Wood et al. | Oct. 19, 1909 |
| 1,538,320 | Gullong | May 19, 1925 |
| 1,604,977 | Crone | Nov. 2, 1926 |
| 2,546,457 | Launder et al. | Mar. 27, 1951 |

FOREIGN PATENTS

| 362,166 | Great Britain | Dec. 3, 1931 |
| 972,195 | France | Aug. 23, 1950 |